United States Patent Office 2,758,968
Patented Aug. 14, 1956

2,758,968
TREATMENT OF COKE OVEN AND SIMILAR EFFLUENTS

Thomas Henry Williams, Market Harborough, and George Stephen Solt, London, England, assignors to The Permutit Company Limited, London, England, Stewarts & Lloyds Limited, Glasgow, Scotland, and Woodall-Duckham Construction Company Limited, London, England No Drawing. Application December 14, 1953, Serial No. 398,196

Claims priority, application Great Britain December 19, 1952

2 Claims. (Cl. 210—24)

This invention relates to the treatment of coke oven effluents and similar liquors.

The disposal of various industrial liquors is a matter of difficulty as they cannot be discharged into streams, nor even into sewers unless they are highly diluted. Coke oven effluents are typical of these liquors, and similar liquors are produced in the carbonisation of various carbonaceous materials such as lignite and coal in gas works. All the liquors in question contain in solution ammonium thiocyanate and also thiosulphates, together with other bodies, particularly volatile ammonium compounds, phenols, higher tar acids and ammonium chloride. Some of these bodies, which may be the higher tar acids, constitute colouring matter. The amounts of these impurities vary from one liquor to another. In some the amounts of thiocyanate and thiosulphate are small and the primary, or possibly the only, problem is to remove the other impurities.

One process at present in use for removing thiocyanate and thiosulphate from these liquors after they have passed through an ammonia still comprises passing the liquor through a bed of anion-exchange material, and this treatment is found to effect almost complete removal of these obnoxious compounds. The phenols are subsequently removed by adsorption on activated carbon, with the result that the final treated liquor is water-white and has a low oxygen absorption, of the order of 5 parts per hundred thousand. In an alternative process forming the subject of the Williams and Hall application Serial No. 380,138 the thiocyanate and thiosulphate are removed, not by ion-exchange, but by preferential oxidation by ozone while the pH of the liquor is 8.4 or less.

Whatever the method by which the thiocyanate and thiosulphate are removed, or if the thiocyanate content is so low that the liquor need not be treated for its removal, the activated carbon adsorbs not only the monohydric phenols, but also the higher tar acids and the colouring matter. The phenols and part of the higher tar acids can subsequently be removed by extracting the carbon with benzene whenever the effluent ceases to be fit for discharge, but much of the colouring matter is irreversibly adsorbed and cannot be extracted. Even though the activated carbon can be used again after extraction, it has a very limited life before it has to be discarded as incapable of adsorbing further compounds.

The usual practice is to use two beds of activated carbon and to pass the liquor in series through the two beds. In this way the first bed will adsorb the greater part of the compounds and the second will only adsorb that part of the compounds which may escape adsorption in the first bed. When, after successive extractions, the first bed is saturated by irreversible adsorption it is taken out of service and the second bed used as the first bed with a fresh bed introduced into the system as the second bed.

As an illustration, in one large-scale process it is found that the carbon can be extracted, i. e. regenerated, 30 times while being used as the second bed, and a further 30 times while being used as the first bed, but then is useless for further treatment of liquor.

An object of this invention is to provide an improved process by which both the life of the carbon before discard is increased and the purity of the treated liquor is improved.

According to this invention a substantial increase in the life of the activated carbon is obtained by passing the liquor through a bed of an alkali-activated anion-exchange material having pores that are large in relation to those of normal anion-exchange material before passing the liquor through the bed of activated carbon. When, as is nearly always the case, there is preliminary removal of thiocyanate and thiosulphate, the liquor is passed through the anion-exchange material with large pores as an intermediate step between the steps of removal of the thiocyanate and thiosulphate and treatment of the liquor with the activated carbon.

The anion-exchange material with large pores is known in itself and can be obtained by forming an anion-exchange resin gel under conditions such that the water cannot escape. Such a synthetic resin gel may be obtained, as described in British Patent No. 650,706, by condensation of an aldehyde with a phenol, an aromatic amine or an aliphatic amine or more than one of these in an aqueous medium with no or substantially no after-treatment by drying. As an example, such a gel may be made by first stirring together 0.44 kg. of meta-phenylene-diamine, 33.75 litres of water and 5.1 litres of commercial hydrochloric acid until the meta-phenylene-diamine is completely dissolved, and then adding 9 litres of 40% formaldehyde solution. The mixture sets to a solid gel, which is cooled and granulated through a sieve having 10 meshes to the inch. The granulated material is then boiled for half an hour with 103.5 litres of 10% formaldehyde solution. Next the material is separated from the formaldehyde solution and boiled with 2½% caustic solution for 15 minutes. These steps of separation and boiling are repeated twice. After separation from the last batch of caustic solution, the material is washed to remove fines and stored under water.

The bed of the material with large pores removes a large part of the colouring matter from the liquor before it enters the activated carbon, and appears to do so by anion-exchange and possibly some adsorption. Presumably the anions of the colouring matter are too large to enter the anion-exchange resins used when the thiocyanates and thiosulphates are removed by ion-exchange, but are able to enter the large pores of the resin used in the intermediate stage. This resin with large pores becomes exhausted from time to time and can then be regenerated with ammonia or other alkali.

The invention leads to an unexpected double improvement in the process. Not only is the life of the activated carbon increased, but also the condition of the final liquor is improved throughout the whole process.

The condition of the liquor is indicated by its pH value, monohydric phenol content (measured in grams/100 cc.) and capacity for absorbing oxygen. The oxygen absorption figure (O. A.) is a measure of the weight of oxygen absorbed from acid permanganate solution after contact between the liquor and the solution for 4 hours at a temperature of 26° C., and is given in parts per 100,000. It may be regarded as proportional to the content of higher tar acids and phenols.

As an illustration, typical coke-oven effluent from which the ammonia has been distilled and the thiocyanate and thiosulphate have been removed by passage through anion-exchange material having pores of the normal small size has the following composition and properties:

| | |
|---|---|
| pH | 1.5 to 2.6 |
| O. A. | 120 to 150 |
| Phenol | 0.05 to 0.07 |

When the effluent liquor from the normal anion-exchange material is passed through a bed of a macroporous anion-exchange material made as described above, it has the following composition and properties on leaving this macroporous bed:

| | |
|---|---|
| pH | 7.2 to 8.1 |
| O. A. | 60 to 100 |
| Phenol | 0.03 to 0.05 |

It will be seen that, by the use of the invention, the activated carbon will not only have less phenol to absorb but also less higher tar acids as shown by the fall in oxygen absorption. Moreover the pH of the liquor has risen to the alkaline side of neutrality so that the final effluent will not need to be treated with alkali either before or after treatment with activated carbon.

The life of the activated carbon is prolonged by means of the invention. If the carbon is in two beds in series, it is the first bed, the condition of which is of course reflected by the condition of the treated liquor leaving it, which must be discharged after a number of regenerations. The quality of the final liquor will, of course, depend on the number of regenerations which the activated carbon has undergone. The presence of the intermediate bed will, however, increase the life of the activated carbon before it becomes unsuitable for further use. Typical figures obtained from a coke-oven liquor at the point where it passed from the first carbon bed to the second after various numbers of regenerations of the carbon, with and without the use of an intermediate bed of an alkali-activated anion-exchange material made as described in detail above, are given below:

| No. of regenerations | Without intermediate bed | | | With intermediate bed | | |
|---|---|---|---|---|---|---|
| | pH | O. A. | phenol | pH | O. A. | phenol |
| 4 | 1.75 | 6.4 | Nil | 7.9 | 4.0 | 0.001 |
| 8 | 2.25 | 55 | 0.02 | 7.2 | 5.9 | 0.001 |
| 15 | 1.0 | 85 | 0.034 | 7.6 | 11.1 | 0.005 |
| 22 | 2.2 | 109 | 0.049 | 7.6 | 16.3 | 0.0071 |
| 30 | 2.2 | 140 | 0.057 | 7.35 | 25.7 | 0.010 |

It will be seen that after only 8 regenerations the oxygen absorption of the liquor leaving the first bed was high when the process was carried on as hitherto without an intermediate bed, but that with an intermediate bed the oxygen absorption was still fairly low after 22 regenerations and not excessive after 30 regenerations. Thus, although without the step of the invention the first bed would have had to be discarded after 30 regenerations, that bed could be regenerated further before being discarded when the invention was used.

The condition of the fully treated liquor, i. e. that leaving the second bed, was as follows:

| No. of regenerations | Without intermediate bed | | | With intermediate bed | | |
|---|---|---|---|---|---|---|
| | pH | O. A. | phenol | pH | O. A. | phenol |
| 4 | 1.75 | 5.8 | Nil | 8.0 | 4.8 | Nil |
| 8 | 2.3 | 6.8 | Nil | 7.3 | 4.5 | Nil |
| 15 | 1.0 | 6.5 | Nil | 7.75 | 4.7 | Nil |
| 22 | 2.3 | 8.5 | 0.003 | 7.7 | 3.1 | Nil |
| 30 | 2.2 | 10.5 | 0.004 | 7.3 | 4.5 | <0.0001 |

These figures show that at all times the liquor is in better condition when the invention is used.

We claim:

1. In a process for purifying a coke oven effluent or similar aqueous liquor, the successive steps which comprise passing said liquor through a bed of an alkali-activated anion-exchange material having pores that are sufficiently large to permit entry of anions of colouring matter contained in the liquor treated, and thereafter treating said liquor with activated carbon.

2. In a process for purifying a coke oven effluent or similar aqueous liquor, the successive steps which comprise passing said liquor through a bed of an alkali- activated anion-exchange material having pores that are sufficiently large to permit entry of anions of colouring matter contained in the liquor treated, said material having been made by the condensation of an aldehyde with at least one member of the group consisting of aromatic amines and aliphatic amines in an aqueous medium to yield a gel with substantially no drying of said gel, and thereafter treating said liquor with activated carbon.

References Cited in the file of this patent

UNITED STATES PATENTS

| | | |
|---|---|---|
| 1,323,239 | Basore | Dec. 2, 1919 |
| 2,151,883 | Adams et al. | Mar 28, 1939 |
| 2,246,527 | Melof | June 24, 1941 |
| 2,597,440 | Bodamer | May 20, 1952 |
| 2,597,491 | Hwa | May 20, 1952 |
| 2,664,396 | Riley | Dec. 29, 1953 |

FOREIGN PATENTS

| | | |
|---|---|---|
| 592,767 | Great Britain | Sept. 29, 1947 |
| 495,401 | Great Britain | Nov. 14, 1938 |
| 650,706 | Great Britain | Feb. 28, 1951 |